United States Patent
Gailloux et al.

(10) Patent No.: US 10,620,973 B1
(45) Date of Patent: Apr. 14, 2020

(54) SYSTEM AND METHODS FOR INJECTION AND MAINTENANCE OF ARTIFACT OBJECTS WITHIN USER EQUIPMENT

(71) Applicant: Sprint Communications Company L.P., Overland Park, KS (US)

(72) Inventors: Michael A. Gailloux, Overland Park, KS (US); Jason J. Garcia, Parkville, MO (US); Peter K. O'Brien, Shawnee, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 332 days.

(21) Appl. No.: 15/591,096

(22) Filed: May 9, 2017

(51) Int. Cl.
| | | |
|---|---|---|
| *G06F 3/00* | (2006.01) | |
| *G06F 9/451* | (2018.01) | |
| *H04M 1/725* | (2006.01) | |
| *G06F 3/0485* | (2013.01) | |
| *G06F 3/0484* | (2013.01) | |
| *H04W 88/02* | (2009.01) | |

(52) U.S. Cl.
CPC ............ *G06F 9/451* (2018.02); *G06F 3/0485* (2013.01); *G06F 3/04842* (2013.01); *H04M 1/72583* (2013.01); *H04W 88/02* (2013.01)

(58) Field of Classification Search
None
See application file for complete search history.

(56) References Cited

U.S. PATENT DOCUMENTS

2011/0078599 A1* 3/2011 Guertler ................. G06F 9/451
715/765

OTHER PUBLICATIONS

Li Yu et al., Depth Based View Synthesis with Artifacts Removal for FTV, Aug. 1, 2011, IEEE Computer Society, pp. 506-510 (Year: 2011).*

Yvonne Tran et al., Evaluating the Efficacy of an Automated Procedure for EEG Artifact Removal, Sep. 1, 2009, IEEE, pp. 376-379 (Year: 2009).*

* cited by examiner

*Primary Examiner* — Tam T Tran

(57) ABSTRACT

A system for injection and maintenance of artifact objects within user equipment (UE) is disclosed. The UE comprises a display, a transceiver, a processor, and a memory storing a mobile application comprising a script and an injection engine that, upon being executed, the processor receives a payload comprising a visual object and an artifact object. The UE determines placement of the visual object and the artifact object into the script of the mobile application, injects the visual object and the artifact object into the script, and presents the visual object at an anchor location on the interface. In response to input to remove presentation of the visual object on the display, the UE determines that the visual object is associated with the artifact object, and removes presentation of the visual object from the display. The UE presents the artifact object at a second anchor location on the interface.

12 Claims, 9 Drawing Sheets

SYSTEM AND METHODS FOR INJECTION AND MAINTENANCE OF ARTIFACT OBJECTS WITHIN USER EQUIPMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User Equipment (UE) (e.g., mobile communication devices) may include operating systems that prevent the direct sharing of information via application programming interfaces between mobile applications on the UE. Each UE may comprise a finite amount of memory and processing resources. Applications running on the UE may expand their memory footprint as each application is used and updated, thus causing application bloating. The concurrent execution of mobile applications on processors of the UE may consume memory resources and may decrease the functioning of the device via slower execution speed, and/or increased battery consumption.

SUMMARY

In an embodiment, a system is disclosed. The system comprises a user equipment (UE), the UE comprising: a display that provides an interface; a radio transceiver that communicatively couples to a wireless network; and a processor coupled the radio transceiver via a communication bus. The UE comprises a memory storing a mobile application comprising a script and an injection engine that, upon being executed, the processor receives a payload comprising a visual object and an artifact object. The UE also determines placement of the visual object and the artifact object into the script of the mobile application based on a header of the payload, and injects the visual object and the artifact object into the script. The UE also presents, via the display, the visual object at an anchor location on the interface. In response to input to remove presentation of the visual object on the display, the UE determines that the visual object is associated with the artifact object, and removes presentation of the visual object from the display. The UE then presents the artifact object at a second anchor location on the interface.

In an embodiment, a method is disclosed. The method includes receiving, by executing an injection engine on a processor of a user equipment (UE), a payload comprising a visual object and an artifact object. The method then continues with determining, by executing the injection engine on the UE, placement of the visual object and the artifact object into a script of a mobile application stored in a memory of the UE. The method includes injecting, by executing the injection engine on the UE, the visual object and the artifact object into the script. The method continues with presenting, by executing the injection engine on the UE, the visual object at an anchor location on an interface of a display. In response to input to remove presentation of the visual object on the display, the method comprises determining, by executing the injection engine on the UE, that the visual object is associated with the artifact object. The method includes removing, by executing the injection engine on the UE, presentation of the visual object from the display. The method also comprises presenting, by executing the injection engine on the UE, the artifact object at a second anchor location on the interface.

In an embodiment, another method is disclosed. The method includes receiving, by executing an injection engine on a processor of a user equipment (UE), a payload comprising a visual object and an artifact object. The method continues with determining, by executing the injection engine on the UE, placement of the visual object and the artifact object into a script of a mobile application stored in a memory of the UE. The method includes injecting, by executing the injection engine on the UE, the visual object and the artifact object into the script, and also presenting, by executing the injection engine on the UE, the visual object at an anchor location on an interface of a display. In response to receiving input to remove presentation of the visual object on the display, the method continues with determining, by executing the injection engine on the UE, that the visual object is associated with the artifact object. The method comprises removing, by executing the injection engine on the UE, presentation of the visual object from the display. The method further includes presenting, by executing the injection engine on the UE, the artifact object at a second anchor location on the interface. In response to receiving input to close the mobile application, the method continues with creating, by executing the injection engine, an artifact message comprising an identifier of the artifact object, an identifier of the visual object, and a user identifier associated with the UE. The method then includes transmitting, by the injection engine before closing the mobile application, the artifact message to a network server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
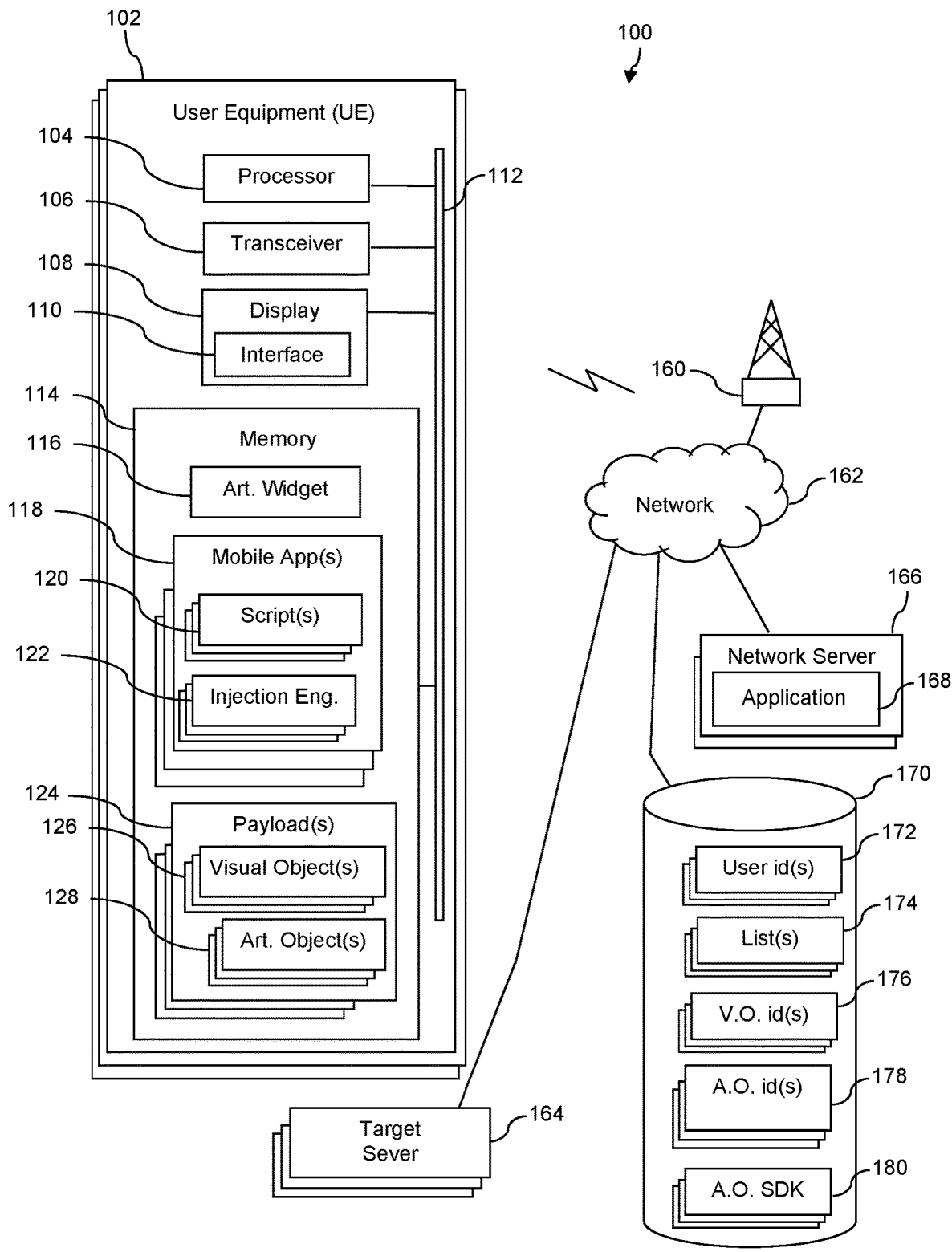
FIG. 1A is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

User equipment (such as mobile devices) may obtain mobile applications via communication networks and once the mobile application is installed and executing, the mobile applications may request and receive information from back-end servers via a wireless network. The mobile applications may be configured to present electronic content, such as images, text, video, games, or any combination thereof. When developers create mobile applications, some operating systems on the user equipment (UE) may deem these mobile applications as third party applications (i.e., applications that are not developed by or for the original equipment manufacturer) and thus restrict these mobile applications from sharing information directly with other third party applications. Because some operating systems may block and/or prevent direct data sharing between mobile applications, it can lead to processing inefficiencies on the UE through the execution of multiple mobile applications, with each application having to establish independent, separate communication requests for content from back-end servers. This may also cause decreased functioning of the communication network due to an increase in network congestion and decrease in available connections.

Additionally, developers of mobile applications may configure the applications to request unsolicited content for placement among the electronic content. For example, if a user is playing an interactive game (i.e., a gaming mobile application developed by a third party) the main gameplay may be presented as the electronic content. The developer of the interactive game may supplement the electronic content by including pauses, breaks, or transitions at defined points of the script which runs the game, and it is at these points that the application presents unsolicited visual and/or audio content, such as images, video, text, or other information presented on a user interface, and may be considered content that is unsolicited by the user.

Outside of the technical realm, the colloquial term for unsolicited content may be known as an electronic advertisement. However, within the technical realm, the presentation of unsolicited content consumes limited processing and networking resources, and thus may unnecessarily increase battery consumption, memory usage, and processor utilization. Additionally, information provided to the user via unsolicited content may typically be unavailable for retrieval after it is presented to the user via an interface, thus leading to additional network requests for attempts to retrieve the same content. As such, technical computing challenges arise specifically because of mobile application use and calls for unsolicited content. Technical challenges may also arise for communication service providers who interact with developers and are charged with ensuring sufficient quality of service for the communication networks. Therefore, embodiments of the present disclosure provide mechanisms that allow for efficient processing of mobile applications on user equipment, reduction in memory footprint by the mobile application on the UE, and reducing the inbound and outbound traffic from the mobile application, thereby reducing congestion of network channels for a communication service provider.

For example, embodiments of the present disclosure provide instances of a software development kit (SDK) for developers to download and execute for the production of mobile applications. Specifically, the communication service provider may provide an artifact SDK that has an injection engine. The injection engine may be embedded within the mobile application so that when the mobile application is executed on a UE, the injection engine can establish communication with a network server via application programing interfaces. The UE may comprise multiple mobile applications, each having an instance of an injection engine. The communication between each instance of an injection engine and an application the network server allows for sharing of information across devices. Additionally, the injection engine may facilitate the injection (i.e., placement) of both visual objects and artifact objects with the mobile applications. A visual object may be presented to the user (via a user interface) as unsolicited content. However, the injection engine treats visual objects and artifact objects differently than conventional unsolicited content.

For example, the injection engine may receive visual objects and artifact objects in a payload, and one or more visual objects may be specifically configured to associate with an artifact object. The injection engine may extract information about the visual objects and artifact objects from a header of the payload, and present the visual object at a defined anchor location on the interface (such as alongside or independent from electronic content). When the presentation of the visual object is removed from the user interface (such as due to user input that scrolls away from the visual object), the injection engine may determine that the visual object is associated with an artifact object, provide the artifact object to a second anchor location on the interface, and present the artifact object with visual content that the user recognizes as being associated with the visual object. The artifact object may be selected and provide click-through communication to the same target (e.g., a webpage, target server, etc.) as the visual object, while consuming a smaller memory footprint and use less space on the user interface, thereby improving the functioning of the UE. This allows for the visual object to be removed from memory, while maintaining the ability to contact the target server and providing information to the user. For example, the use of artifact objects allows a user to go back and view, access, and/or retrieve information that was previously presented via the visual object even after the user has dismissed or scrolled past content showing (via the visual object) a coupon code for the user's favorite shoe company and/or even after the visual object is removed from memory on the UE. In some embodiments, the injection engine may place one or more artifact objects within a collapsible display of an artifact bucket. This may allow for discrete and efficient access to multiple artifact objects while the user interacts with the mobile application. Thus, after a user scrolls past or dismisses visual content, the visual objects may be removed from the user interface and/or memory of the UE. When the user scrolls back to the anchor locations where the visual objects were originally presented, the visual objects may no longer be presented and may have been deleted from the memory. However, the artifact bucket may provide interactive window on the user interface in which one or more artifact objects are populated within after the visual objects are removed from the user interface. This allows the user to access the content and sources presented by the visual object (e.g., website, target server, etc.) on demand by selecting the interactive window of the artifact bucket, and in response, the artifact bucket presents one or more artifact objects within the window.

The present disclosure may also provide for the sharing of artifact objects irrespective of the restrictions placed on mobile applications via the operating system, specifically via the use of an artifact widget. In some embodiments, the artifact SDK may include an artifact widget that can be installed on the UE and execute independently from the mobile application. The injection engine may communicate with an application on a network server that maintains a list of the visual objects and artifact objects that have been sent to injection engines embedded within mobile applications on one or more user equipment. When a user pauses or exits out of one mobile application, the injection engine may communicate with the network server and update the list with the artifact objects that were displayed during the execution session. An application on the network server may communicate via the network with both the artifact widget and each injection engine associated with the identity of a user. The artifact widget may pull and/or request the list from the network server and populate a selectable menu with artifact objects that were presented across devices and/or mobile applications. As such, the present disclosure may reduce congestion on the network by decreasing the amount of calls for unsolicited content from mobile applications, while also improving the functioning of user equipment.

The preceding paragraphs are not intended to be limiting, but are illustrative of example benefits of the system and methods described by this disclosure according to some embodiments. Examples of systems and methods will now be described in more detail according to some embodiments of the present disclosure.

FIG. 1A shows an example of a communication system 100 in accordance with various embodiments of the present disclosure. The example of the system 100 comprises user equipment (UE) 102, cell site 160, network 162, artifact database 170, network server 166, and target server 164, where each may communicatively couple to each other and the network 162 via wireless and/or wired communication technology. Any number of UEs 102 can be in wireless communication with any number of cell sites 160, and through their respective cell sites to network server 166. In the example shown in FIG. 1, the UE 102 includes a radio transceiver 106, a processor 104, a display 108, a communication bus 112, and memory 114. The display 108 may be configured to present a graphical user interface 110 and may include a touchscreen to receive user input, thus providing user interaction with the interface 110.

The UE 102 may be configured in a variety of form factors, including but not limited to a mobile telecommunication device, such as a mobile phone (including smart phones), tablet computer, wearable computing device (e.g., smart watch, smart glasses, helmet cam, etc.), digital media player, electronic book readers, notebook computer, gaming platforms (e.g., portable and/or non-portable gaming console), virtual reality headsets, a personal computer having an integrated or external wireless network transceiver, or other non-generic devices that may be configured for wired and/or wireless communication. It is understood that embodiments of devices within the present disclosure (e.g., UE 102, target server 164, network server 166, database 170, etc.) are non-generic, particular machines that operate and function based on configuration by the features disclosed herein.

The processor 104 may couple to the radio transceiver 106, memory 114, and display 108 via one or more communication bus 112. The radio transceiver 106 provides a wireless communication link to the UE 102 and couples the UE 102 through the cell site 160 to network 162. A cellular service provider may provide and operate at least a portion of network 162 to which the various cell sites 160 communicate to network server 166 and to each other. The memory 114 may be separate from the processor 104 as shown, or may be integrated into the processor 104. The memory 114 may be considered a storage device that includes volatile storage, non-volatile storage, or a combination of both volatile and non-volatile storage devices. Each storage device may be a single storage device or multiple storage devices.

The cell site 160 is configured to provide a wireless communication link to the UE 102 according to at least one wireless communication standard and/or protocol. Examples of such wireless standards and/or protocols include standards under the 3rd Generation Partnership Project (3GPP) and/or protocols such as Long Term Evolution (LTE), Worldwide Interoperability for Microwave Access (WiMAX), High Speed Packet Access (HSPA), Code Division Multiple Access (CDMA), Global System for Mobile Communication (GSM), Bluetooth®, Wi-Fi, or any combination thereof. A cell site 160 may, in some embodiments, be referred to according to the communication technology with which it supports, such as being referred to an enhanced Node B (eNB) for corresponding to an LTE technology, or a base transceiver station (BTS) for corresponding to a GSM technology. At least cell site 160 may be implemented within system 100 to facilitate and/or provide a wired and/or wireless communication link to one or more UE 102 and communicatively couple it to the network 162.

Network 162 may include a plurality of switches, routers, software, and other elements to provide connectivity for the UEs 102 to the service provider's servers (e.g., server 166), storage, and various services offered by the service provider associated with at least a portion of network 162. Embodiments of network 162 may comprise a public network, private network, wired network, wireless network, or any combination thereof and comply with the wireless standards discussed above. Target server 164 and network server 166 each include a processor coupled to storage, where storage may include volatile storage (e.g., random access memory), non-volatile storage (e.g., hard disk drive), or combinations of both. The target server 164 may be associated with a service that pays to have electronic advertisements sent to UE 102 via visual objects and artifact objects. For example, the target server 164 may host a back-end service that electronically advertises based on electronic content presented by mobile application (e.g., application 118). The target server 164 may have a profile stored in artifact database 170 that allows an application of network server 166 to know the subscription status of the target server 164, and which visual object identifiers 176 and artifact object identifiers 178 pertain to the profile. In some embodiments, the profile may be stored within artifact database 170 so that developers of mobile application 118 can determine content that the user may be interested in and electronically advertise using the visual objects and artifact objects associated with target server 164.

Each of artifact database 170, network server 166, and target server 164 may be in communication with each other and/or one or more UEs via the network 162, and each includes one or more processors and memory. In some embodiments, artifact database 170 (also referred to as an artifact data storage) may be a remotely-located data store having a plurality of data storage devices (e.g., cloud storage). Each of artifact database 170, network server 166, and target server 164 includes a network communication device (e.g., transceivers), memory (also referred to as a storage device), and a processor. Memory may be separate from the processor of each device, or may be integrated into the processor. The memory may be considered a storage device that includes volatile storage (e.g., random access memory), non-volatile storage (e.g., solid state storage), or a combination of both volatile and non-volatile storage devices. Each storage device may be a single storage device or multiple storage devices. It is understood that embodiments of system 100 may comprise more than one of each device illustrated in FIG. 1, such as the total number of UE 102 may be in the thousands and/or millions and a plurality of cell sites 160, servers (e.g., network server 166), databases (e.g., artifact database 170) may collectively be implemented to facilitate and/or provide wireless communication links and communication service to the network 162 for a wireless service provider.

Referring still to FIG. 1A, the memory 114 of UE 102 includes an artifact widget 116 (referred to as widget), one or more mobile applications 118, and one or more payloads 124. The widget 116 may be executed as background processes without being invoked by a user of the UE 102 (e.g., triggered by a power-on reset event). In some embodiments, a user may manually start, pause, and/or stop execution of widget 116. The widget 116 is executable by the processor 104 and configures the UE 102 to perform the functionality described herein attributed to it. The memory 114 includes at least one mobile application 118 that has a script 120 which configures processor 104 upon execution. For example, the script 120 may comprise a plurality of defined routines and strings that allow for presentation of electronic content at defined locations on the graphical interface 110 upon execution by processor 104. Electronic content may be displayed on interface 110 upon execution of mobile application 118 by processor 104. Electronic content includes digital files and data such as, but not limited to, electronic video, audio, images, games, books, articles, maps, or other software that presents digital content at specific portions of the interface 110. Examples of mobile application 118 may include, but are not limited to, social networking applications, gaming applications, photography applications, ride sharing applications, navigation applications, banking/finance applications, messaging applications, email applications, calendar applications, reading applications, shopping applications, travel applications, internet-of-things applications, weather applications, education application (e.g., word processing, spreadsheet, presentation, etc.), audio applications, video applications, network applications, or any combination thereof.

At least one mobile application 118 stored in memory 114 also includes an engine 122 (referred to as an injection engine) that executes and configures processor 104. An instance of injection engine 122 is included in each mobile application that was developed using artifact software development kit (SDK) 180 (referred to as artifact SDK). The communication service provider that provides service to one or more UE 102 may make artifact SDK 180 available for download to developers. Instances of artifact SDK 180 may be stored in the memory of artifact database 170 and may, in some embodiments, be provided for download on a webpage accessed via network 162. The software developer of mobile application 118 may use artifact SDK 180 to write code (e.g., script 120) to facilitate execution and presentation of electronic content and use artifact SDK 180 to incorporate engine 122 into the mobile application 118. The artifact SDK 180 provides the mobile application 118 with the injection engine 122 so that the mobile application 118 can present (in addition to the electronic content provided via script 120) visual objects 126 and artifact objects 128 displayed at defined locations on the interface 110. It is understood that, in some embodiments, instances of injection engine 122 may be included in a plurality of mobile applications stored in UE 102.

In some embodiments, the artifact SDK 180 may, upon execution by a processor, identify whether the mobile application 118 is going to be installed on an operating system of the UE 102 that permits sharing of information between applications. Both the widget 116 and the injection engine 122 comprise an application programming interface (API). In some embodiments, the widget 116 may be granted permission, by the mobile application 118 and/or the operating system of UE 102, so as to share information from the injection engine 122. If sharing between mobile applications is not allowed, the artifact SDK 180 may offer to provide widget 116 for installation in the memory 114 of UE 102. To indirectly share information between the injection engine 122 and the widget 116, the API's of the widget 116 and injection engine 122 are accessible to the network server 166 and/or target server 164 via radio transceiver 106. The injection engine 122 may send information to the network server 166, which in turn may be relayed back to the widget 116 via transceiver 106. In some embodiments, only one widget 116 is installed and stored in memory 114 and may interact with a plurality of mobile applications that each have injection engine 122 embedded therein.

The memory 114 of UE 102 may store at least one payload 124. One or more payloads 124 may be sent to the mobile application 118 from the network server 166 in response to execution of the mobile application 118. In some embodiments, a plurality of payloads 124 are sent to the memory 114, with each payload being requested and/or pulled from network server 166 at a defined point in the script 120 upon execution by the engine 122. The script 120 may comprise a plurality of defined routines and strings that allow for presentation of electronic content at defined locations on the graphical user interface 110 upon execution by processor 104. The script 120 may comprise pointers that call to injection engine 122 at defined execution points so that injection engine 122 can provide the script 120 with one or more visual objects 126 and/or artifact objects 128 for presentation at defined anchor locations on the interface 110. The injection engine 122 may store visual objects 126 and artifact objects 128 at reserved memory locations on memory 114.

Each payload 124 may comprise a visual object 124 and an artifact object 128. In some embodiments where multiple payloads 124 are received on the UE 102, the injection engine 122 may determine which payload(s) have artifact objects 128, and prioritize the payloads containing artifact objects 128 for execution before other payloads that do not contain (or are not associated with) artifact objects 128. As used herein, a visual object 126 includes executable instructions that provide digital content which is unsolicited by the user on interface 110. Put simply, a visual object 126 may be an electronic advertisement (ad) data structure and may be configured to exhibit an association with an artifact object 128, thereby allowing an injection engine to detect relationships between visual objects and artifact objects. Each visual object 126 includes a visual object identifier, which is known to network server 166 via storage of visual object identifiers 176 in artifact database 170. A visual object 126 may have a data structure that is configured to present an image and/or video within a defined pixel window, with pixel dimensions (e.g., length by width) formatted to be presented on the interface 110 of display 108 via execution of mobile application 118. In some embodiments, the visual object 126 is included in payload 124 without specification as to how the visual object should be displayed on the interface 110 and thus the engine 122 adapts the visual object 126 to the defined pixel dimensions and location on the interface 110. A visual object 126 may be presented as a native ad and/or interstitial ad. Examples of a native ad may include a banner window and/or a medium rectangle (MREC ad) having defined pixel dimensions (e.g., 300×250 pixels). An interstitial ad may be presented as a visual object 126 on the interface 110 in a pixel dimension based on the size of the display 108.

In some embodiments, a visual object 126 may be configured with a close and/or exit button that removes presentation of the visual object 126 from the interface 110. User input via interface 110 may correspond with the close and/or exit button, thus causing the injection engine 122 to remove presentation of the visual object 126 from being presented on display 108. Each visual object 126 includes an object source reference that may be embedded in the visual object 126. An object source reference comprises a uniform resource indicator (URI) that may identify the visual object identifier 176 associated with the visual object 126, a target address that identifies and provides connection to a resource target over the network 162 (e.g., a URL identifying target server 164 to obtain a webpage, coupon, offer code, or other resource related to the advertisement and made available by target server 164), and how the visual object 126 was presented (e.g., as a native ad or interstitial ad). In some embodiments, at least some of the information from the object source reference is comprised within a header of payload 124. The object source reference may be embedded in the visual object 126 such that when user input (via interface 110) selects visual object 126, a request message is sent to target server 164 based on the URI (and thus target address) embedded therein. In some embodiments, the injection engine 122 may determine how long (e.g., in seconds) a visual object 126 is presented on interface 110 before it is removed from presentation. In some embodiments, the determined time may be included in the message and/or URI sent to the target server 164.

A payload 124 may also include at least one artifact object 128. Unlike a visual object 126, an artifact object 128 may not initially be presented on interface 110 when mobile application 118 is executing, but rather is triggered based on the presentation of a visual object 126. Each artifact object 128 corresponds and is associated with one or more visual object 126. An artifact object 128 includes a data structure that may be configured to present an image and/or video at a different location on the interface 110 in response to the visual object 126 being removed from presentation on the interface 110 and/or deleted from memory 114. Put simply, an artifact object 128 may allow the user to access information previously presented by a visual object even after that visual object is removed from presentation on the interface 110 and/or removed from memory 114. For example, a user may scroll past a visual object 126 presented on the user interface. In some instances, the user may desire to scroll back up to where the visual object was previously presented, and discover that the visual object 126 is no longer presented on the display (whether due to the visual object 126 being replaced with another visual object 132, due to visual object 126 being removed from memory, and/or visual object 126 being retained in memory but no longer displayed). Conventional electronic ads would not allow the user to retrieve the content and/or obtain information about the electronic ad on demand after the electronic ad was removed from the display and/or memory. In contrast, embodiments of the present disclosure allow for the injection engine 122 (and/or artifact widget 116) to detect that the visual object 126 is related to an artifact object (e.g., 128) and allow the user view and retrieve content related to visual object 126 even though it was dismissed and/or deleted, and this is possible through the artifact object (e.g., 128) that may provide a visual and/or audible indicator to the user so as to convey that the two are related (i.e., that the artifact object is associated with the visual object that is no longer presented) and provide a link (via the artifact source reference) to the same target as the visual object's object source reference (i.e., target server 164). The use of artifact objects may decrease the memory footprint and decrease processor utilization on the UE 102 through fewer processing usage cycles on the processor 104, while still retaining the ability to access the target server 164 to access and/or obtain content previously presented via the visual object.

Each visual object e.g., 126 has a defined file size (e.g., amount of kilobytes (KB)) and the artifact object 128 (corresponding to visual object 126) is configured to have a smaller file size and/or pixel dimension size that its corresponding visual object 126. For example, the artifact object 128 may be have a file size that is a tenth of the visual object 126 (e.g., artifact object 128 having a file size of 10 KB while visual object 126 has a file size of 100 KB) and/or a pixel dimension that is smaller than that of the visual object 126 (e.g., artifact object having a pixel dimension of 50×50 versus the visual object's 126 pixel dimension of 150×80). The image and/or video presented by the artifact object 128 may be based on the visual object 126, but the two may not present identical content. For example, visual object 126 may present an image with a manufacturer's logo and a promotion code, whereas the artifact object 128 may present (when prompted by the injection engine 122) only a logo of the manufacturer or another predefined image related in style (e.g., color or font) to the visual object 126.

Each artifact object 128 includes an artifact source reference. An artifact source reference identifies the visual object 126 to which it is associated and identifies the same resource target as the visual object's 126 object source reference, however the artifact source reference is distinct from the object source reference. An artifact source reference comprises a uniform resource indicator (URI) that identifies the visual object identifier 176 associated with the visual object 126 (due to artifact object 128 being associated with visual object 126), an artifact object identifier 178 (which identifies and allows for the artifact object 128 to be mapped to its corresponding visual object identifier 176), a target address that identifies and provides connection to the same resource target over the network 162 (e.g., a URL identifying target server 164 to obtain the same webpage, coupon, offer code, or other resource related to the advertisement presented in visual object 126 and made available by target server 164), and/or (in some embodiments) a time (in seconds) identifying how long it took between the visual object 126 being removed from presentation until the artifact object being selected via user input with the interface 110. One or more artifact objects 128 may be presented at a different location on interface 110 after its corresponding visual object (e.g., 126) is no longer fully and/or partially presented on the display 108. A developer may predefine the pixel dimension of the artifact object 128 via artifact SDK 180.

The artifact object 128 is configured to be selectable by a user via interface 110. The artifact source reference may be embedded in the artifact object 128 such that in response to user input that selects the artifact object 128, the injection engine 122 (or in some embodiments widget 116) uses the URI of the artifact source reference to send a message to the same target server 164 that visual object's 126 object source reference points to. The artifact source reference enables the target server 164 and/or network server 166 to ascertain that the content being obtained for the UE 102 is due to selection of the artifact object and not its associated visual object. Conversely, the visual object's object source reference enables the target server 164 and/or network server 166 to identify that the content being requested/obtained for the UE 102 is due to a user's selection of the visual object and not its associated artifact object. By this, the use of artifact objects allows for enhanced monitoring and tracking of which visual objects and/or artifact objects are relevant to the user and what mechanism was used (i.e., either the artifact object or its associated visual object) to request and obtain content associated with the presentation of the artifact object and/or visual object.

The message sent in response to selection of the artifact object 128 comprises information contained within the artifact source reference and is used to request the electronic content presented by the visual object 126 (e.g., the webpage, offer code, etc.). In some embodiments, the network server 166 may be an intermediary between UE 102 and target server 164. As an intermediary, the network server 166 may detect and intercept any message sent by injection engine 122, such as being sent in response to selection of the artifact object 128 and/or closing of mobile application 118. The network server 166 may obtain the information in the artifact source reference and then forward (i.e., continue transmission) the message to the target server 164. In another embodiment, the network server 166 may be sent a duplicate and/or separate message (containing information in the artifact source reference) from the injection engine 122 in response to the artifact object 128 being selected. The network server 166 may analyze the information received from the injection engine 122 about the artifact objects 128 to determine which artifact objects 128 are being selected, how often selection occurs, and how quickly selection of the artifact object 128 occurs after the corresponding visual object 126 is removed from interface 110 and/or memory 114. In some embodiments, the injection engine 122 may determine that artifact object 128 is associated with visual object 126, and in response to selection of artifact object 128, the injection engine 122 may remove visual object 126 from memory 114 while retaining artifact object 128 in memory 114. This may increase the processing efficiency of UE 102 by reducing the amount of memory 114 taken up by mobile application 118. In an embodiment, the message sent and/or intercepted by network server 166 may include a flag as to whether visual object 126 was deleted from memory 114 subsequent to selection of artifact object 128. In some embodiments, the network server 166 may also identify (based on the message) whether the artifact object 128 was located and presented within an artifact bucket, which is further discussed herein.

Figure 1B:
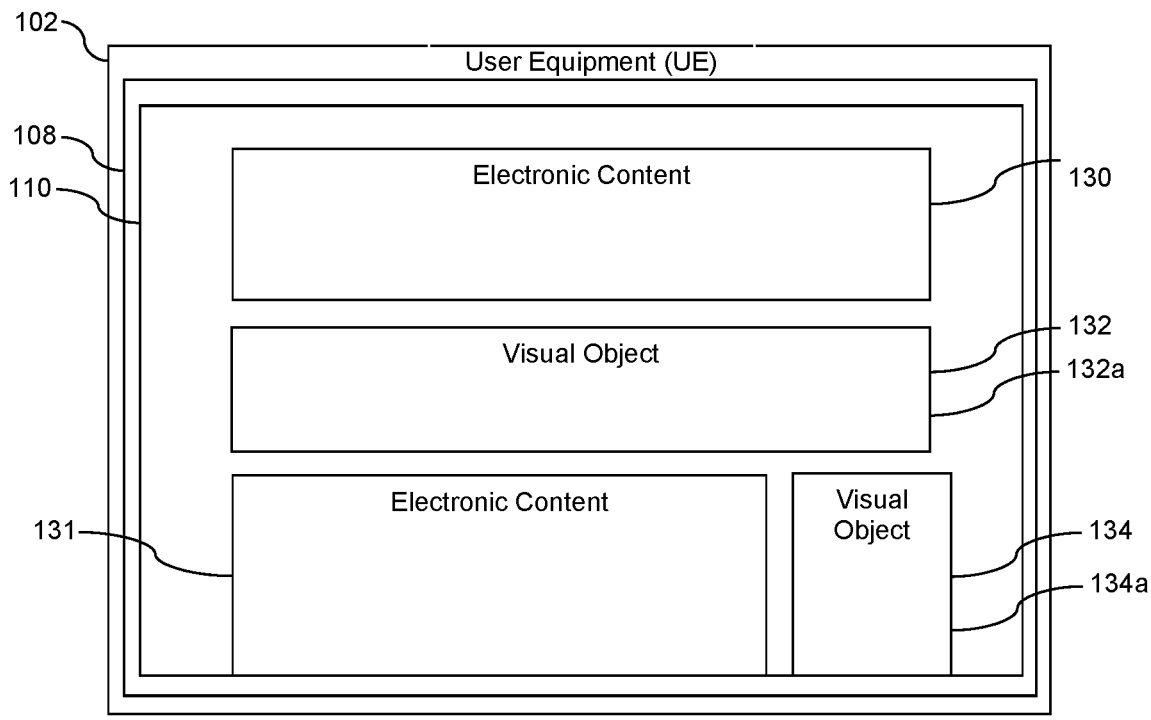
FIG. 1B is a block diagram of an interface on user equipment from FIG. 1A according to an embodiment of the disclosure.
Figure 1C:
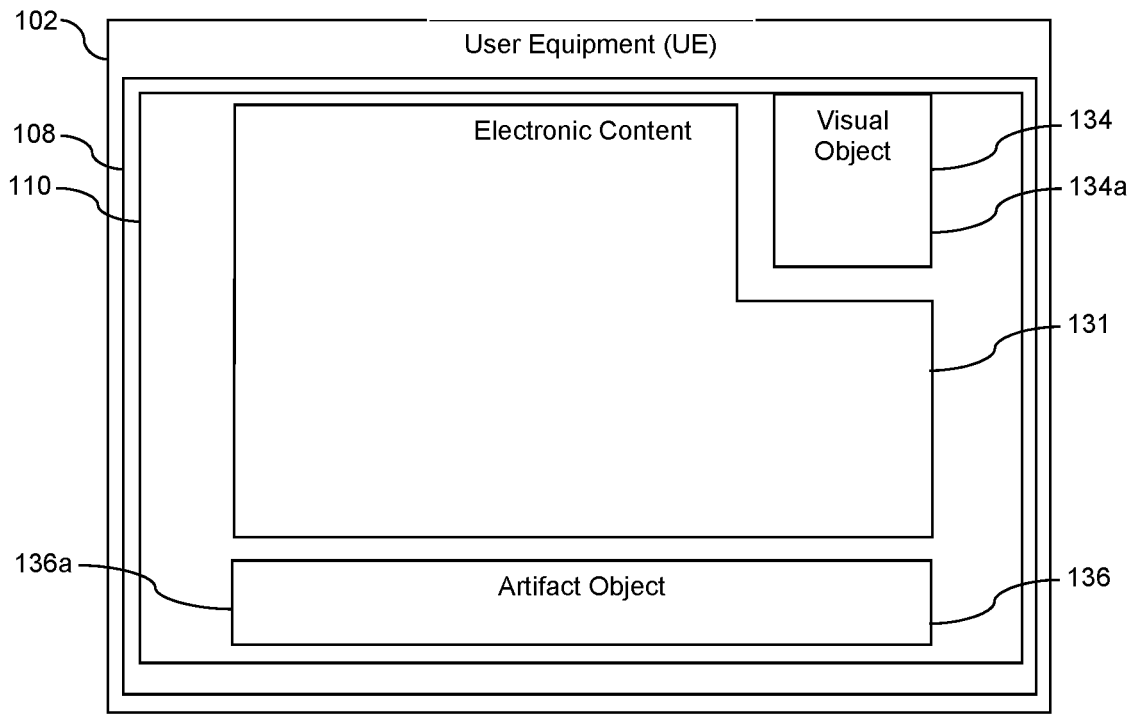
FIG. 1C is a block diagram showing another embodiment of a user interface on user equipment from FIG. 1A according to the disclosure.

Turning to FIGS. 1B and 1C with continued reference to system 100 in FIG. 1A, examples of a user interface 110 on UE 102 is shown. The injection engine 122 may execute and provide mobile application 118 with visual objects 132, 134 and at least one artifact object (e.g., 136) for presentation on user interface 110. Once the mobile application 118 is installed on the UE 102, the injection engine 122 may receive payload 124 comprising at least one visual object 126 and at least one artifact object 128. For example, Visual objects 132, 134 are embodiments of visual object 126 and may be included in payload 124. Artifact object 136 is an embodiment of artifact object 128 and may be included in payload 124. In some embodiments, the payload 124 may comprise a plurality of visual objects and a plurality of artifact objects. In addition to the features discussed with respect to visual object 126, visual objects 132 and 134 comprise their own visual content (such as an image or video corresponding to an electronic ad), an object source reference, and an association to a particular artifact object (such as artifact object 136 or artifact object 138 in FIG. 1E). The payload 124 may include a header that comprises one or more of: the identifiers of the visual objects, identifiers of the artifact objects, object source references for each visual object comprised therein, artifact source references, and anchor location values. Each visual object may be assigned an anchor location value based on the number of available slots for presenting the visual object. The anchor location value designates the position in which visual object should be displayed. For example, in FIG. 1B, interface 110 presents visual objects 132 and 134 at anchor locations 132a and 134a, respectively. The script 120 of mobile application 118 may define anchor location 132a to be at slot "1" and anchor location 134a to be at slot "2". Thus, if visual object 132 has an anchor location value of "1" then it will be placed in the first slot (i.e., anchor location 132a) and visual object 134 may have an anchor location value of "2" for placement in the second slot (i.e., anchor location 134a). As used herein, a "slot" refers to a placeholder container located at one of the anchor locations such that execution of mobile application 120 will present the content of a visual object (such as an image or video of visual object 132) at an anchor location (e.g., anchor location 132a) on the user interface 110.

In some embodiments, the header of payload 124 may indicate priority values for each artifact object identifier so that the injection engine 122 can rank and/or present the artifact objects in a particular order. For example, priority values may be on a scale from one to ten, where a value of "one" will be given highest priority and numbers two through 10 will have lower priority, thus causing artifact objects to be presented according to a descending order. The script 120 may have placeholders (e.g., pointers) corresponding to the anchor locations which point to the injection engine 122 for determination of which visual object or artifact object should be placed there. Using the anchor location values and/or the priority values in the header of the payload 124, the injection engine 122 determines placement of each visual object in the script 120 of the mobile application 118. For example, when the injection engine 122 determines that the anchor location value and/or priority value matches a predefined placeholder value in the script 120, the injection engine 122 injects the corresponding visual object and/or artifact object into the script 120. The injection into the script 120 may occur by the injection engine 122 placing the visual objects and/or artifact objects in reserved memory sectors of memory 114, which the script points to. As such, the injection engine 122 can dynamically adjust the placement, order, duration, and frequency with which artifact objects and visual objects remain available for presentation in the mobile application 118.

As the mobile application 118 executes script 120 and once the visual objects and artifact objects have been injected and ready for use, at least one visual object is presented at an anchor location on interface 110 via display 108. In some embodiments, a visual object may be displayed alongside electronic content. For example, mobile application 118 may present electronic content 130, 131 (e.g., images, a news feed, social media feed, video, etc.) with a visual object 132 presented in between at a first anchor location 132a, as shown in FIG. 1B. In some embodiments, a visual object 132 may obstruct and/or obscure at least a portion of electronic content presented by mobile application 118 (e.g., where a visual object 132 is presented as an interstitial ad). Irrespective of whether visual object 132 obstructs the presentation of electronic content (e.g., 130, 131), the user may be able to remove presentation of the visual object on the display 108. For example, the script 120 may have instructions to display visual object 132 for a defined time period, and thus once the time period expires, the visual object is no longer presented on the interface 110. In some embodiments, the visual object may comprise a close or exit button, which can be clicked or selected via user input to perform an action of removing the visual object from the interface on the display. In some embodiments, a user may provide input—such as via touch, audio instructions (e.g., via a microphone on the UE), and/or video instructions (e.g., commands via a camera on the UE)—to scroll past, swipe away, and/or downsize the visual object that was presented on the interface, thereby removing the visual object from the display. For example, as the user scrolls down the screen via input to interface 110, the embodiment of interface 110 on FIG. 1B may transition to present the embodiment of interface 110 on FIG. 1C. Thus, the electronic content 130 and visual object 132 that are presented on the interface 110 in FIG. 1B may be removed from presentation in response to user input to interface 110, and in turn the embodiment of interface 110 on FIG. 1C is presented.

In some embodiments, the injection engine 122 may delete one or more visual objects from memory 114 in response to input that removes presentation of the visual object (e.g., 132) from the interface 110 on the display 108. When injection engine 122 deletes a visual object from memory 114, the injection engine 122 can maintain storage of the associated artifact object, thus allowing for reduced memory and battery usage (due to smaller file size) while still retaining information about the visual object. For example, in FIG. 1B the visual object 132 is presented at anchor location 132a on interface 110. When the user scrolls past visual object 132 (as shown in FIG. 1C), the injection engine 122 may present artifact object 136 at the second location anchor 136a due to its association with visual object 132 (e.g., having an artifact source reference that identifies the visual object identifier for visual object 132). If visual object 132 is deleted from memory 114, the injection engine 122 may still retain and maintain artifact object 136 in memory for a defined time and/or until a command (e.g., from injection engine 122, user input, network server 166) prompts the injection engine 122 to clear one or more artifact objects. For example, the defined time may be for 24 hours, one week, one month, or upon a request from network server 166. The artifact objects may be replaced and/or swapped out with new artifact objects by the injection engine, and the replacement may be dependent and/or independent of the visual objects being replaced on the UE 102.

In response to input to remove (i.e., no longer show) presentation of a visual object (e.g., 132) on the display 108, the injection engine 122 may determine that the visual object 132 is associated with an artifact object (e.g., 136). For example, injection engine 122 may extract the artifact source reference from a header of payload 124 about an artifact object comprised therein, such as if payload 124 comprised artifact object 136. The artifact source reference for artifact object 136 may identify visual object 132 to which the artifact object 136 is associated with. Thus, the injection engine 122 can determine and verify that an association exists when the visual object identifier of the visual object 132 (that is being closed and no longer presented on interface 110) matches the visual object identifier in the artifact source reference of artifact object 136. When input is received to no longer present visual object on the display (e.g., input that transitions from the embodiment of interface 110 shown in FIG. 1B to the embodiment of interface 110 shown in FIG. 1C), the injection engine 122 may no longer present the visual object on the interface 110 (i.e., remove presentation of the visual object). In some embodiments, the injection engine 122 may determine that an association between a visual object and an artifact object exists prior to receipt of input requesting that the visual object be no longer presented.

Once the injection engine 122 determines that the visual object at hand is associated with an artifact object (e.g., visual object 132 being associated with artifact object 136), the injection engine 122 populates and presents the artifact object (e.g., 136) at a second anchor location (e.g., 136a) on interface 110. For example, the injection engine 122 may pull the visual content (e.g., an image and/or video file) from the artifact object 136 and present it at a second anchor location 136a, which is located at a predefined position on the interface 110 relative to the electronic content 130.

Each artifact object may respond to user input. For example, when the user provides input via interface 110 at the location anchor of the artifact object (e.g., location 136a for artifact object 136), the injection engine 122 may allow a click-through action to occur, such as generation of a message using the artifact source reference. The message may comprise the identifier of the visual object associated with the artifact object (e.g., identifier for visual object 132 because it is associated with artifact object 136) and the identifier of the artifact object that was selected (e.g., 136). The message may be transmitted to the target server 164 and/or network server 166.

In an embodiment, the injection engine 122 may handle presentation of multiple artifact objects associated with visual objects that were presented on interface 110. For example, the mobile application 118 may initially present a plurality of visual objects (e.g., 132 and 134) on interface 110, such as illustrated in FIG. 1B. The presentation of the visual objects 132, 134 may be according to a defined presentation sequence based on the anchor location values of the visual objects as defined in each visual object's object source reference, as discussed above. For example, visual object 132 may be presented before visual object 134 due to visual object 132 having an anchor location value that is more senior (i.e., ranked higher by injection engine 122 on a predefined scale, such as 1 to 10 with 1 being more senior than numbers 2 through 10) than visual object 134's anchor location value. When input is received to remove presentation of one visual object, then injection engine 122 may present an artifact object associated with that visual object. In embodiments, where input is received to remove presentation of subsequent and/or multiple visual objects, the injection engine 122 may determine how to handle the multiple artifact objects associated with visual objects.

For example, the injection engine 122 may detect input to remove presentation of a plurality of visual objects presented on the interface, such as scrolling past or closing at least visual objects 132, 134. The injection engine 122 may determine that two of the plurality of visual objects (e.g., 132, 134) corresponds with two of the artifact objects (e.g., 136 and 128) from the payload (e.g., 124). For example, injection engine 122 may determine that artifact object 136 is associated with visual object 132 and thus present artifact object 136 at anchor location 136a when visual object 132 is no longer presented on interface 110. In an embodiment where at least some of visual object 134 is no longer presented on interface 110 (such as the embodiment of interface 110 shown in FIG. 1C), the injection engine may determine that visual object 134 is associated with artifact object 138 (which may not yet be presented on the embodiment of interface 110 in FIG. 1C but included in payload 124). The injection engine 122 may wait a predefined time period and replace artifact object 136 with artifact object 138 after expiration of the time period. In another embodiment, the injection engine 122 may rotate presentation of artifact objects 136 and 138. In yet another embodiment, the artifact object 138 may be presented at a third anchor location on interface 110 in response to visual object 134 being completely removed from presentation on the interface. The injection engine 122 may present both artifact object 136 and 138 at the same time on interface 110, with their placement based on each one's priority value indicated in the header of payload 124 and/or their artifact source reference.

Figure 1D:
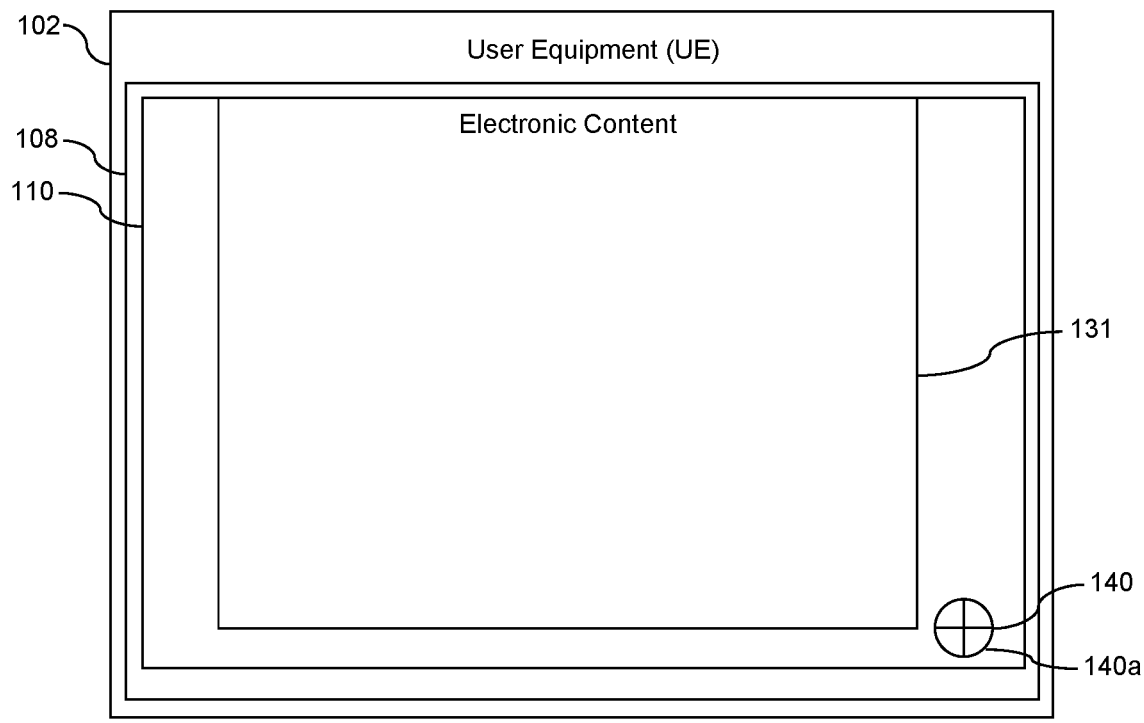
FIG. 1D is a block diagram showing another embodiment of a user interface on user equipment from FIG. 1A according to an embodiment of the disclosure.
Figure 1E:
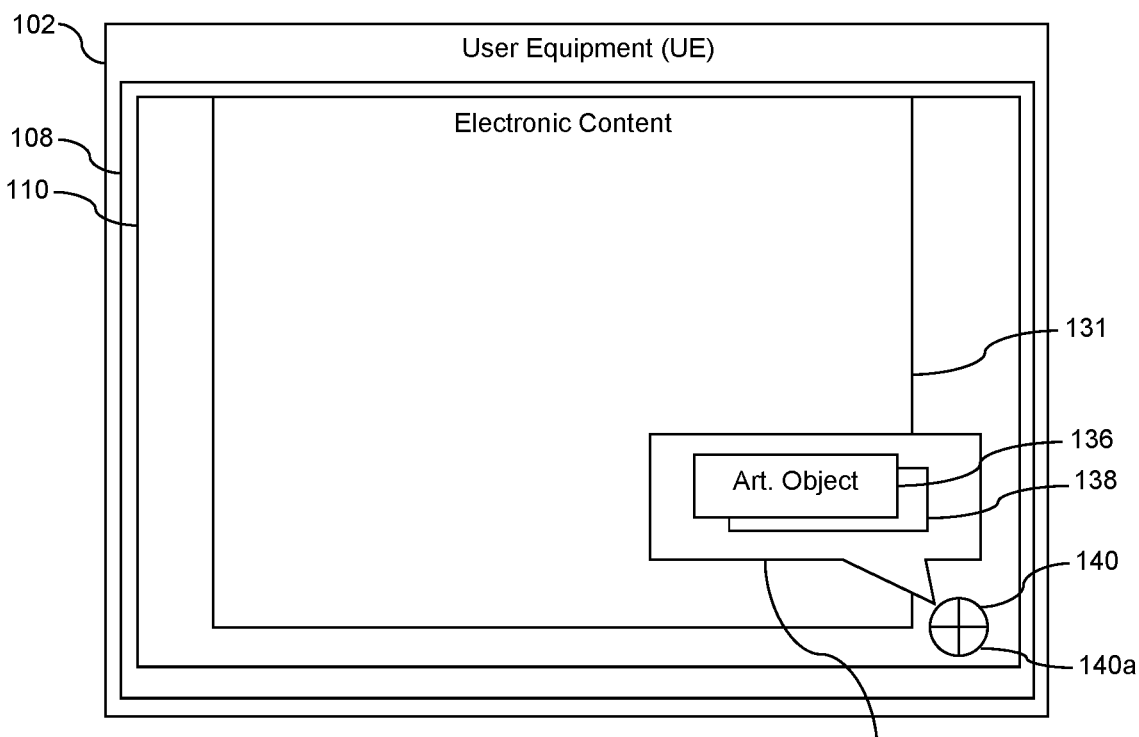
FIG. 1E is a block diagram showing another embodiment of a user interface on user equipment from FIG. 1A according to an embodiment of the disclosure.

Turning to FIGS. 1D and 1E with continued reference to FIGS. 1A through 1C, in some embodiments, one or more artifact objects (e.g., 136 and/or 138) may be placed within an artifact bucket 140, where the artifact bucket 140 is configured to be responsive to a user providing input at a location on the user interface (e.g., 140a on the embodiment of interface 110 in FIG. 1D). Artifact bucket 140 may be configured to present multiple artifact objects that have been included within one or more payload 124 and/or that have been archived in memory 114 or database 170 previous payloads. An artifact bucket (e.g., 140) includes a digital container 142 (i.e., a graphical user interface object of the artifact bucket) that is presented as a defined graphical area (e.g., a collapsible window) for graphical content (i.e., artifact object(s) 128) to be presented within. The artifact bucket 140 includes executable instructions that configure a processor to present the digital container 142 on the user interface. The artifact objects can be presented within the digital container 142 of the artifact bucket 140. In some embodiments, the digital container 142 may be referred to as a selectable menu, such as the digital container 142 shown in FIG. 1E. In some embodiments, the digital container 142 may be shown as an icon on the user interface at location 140a when it is minimized or collapsed. In response to selection of the digital container 142 when it is collapsed, the artifact bucket 140 may expand the digital container 142 into a larger window. In some embodiments, the artifact bucket 140 and its digital container 142 may be shown on interface 110 as a selectable image indicating that the artifact bucket 140 is expandable and/or contains artifact objects.

For example, the artifact bucket 140 may display a shape that comprises any of a cross, a rectangle, a plurality of lines indicating menu, a triangle, a tab. In some embodiments, the artifact bucket 140 may be at least partially transparent so that electronic content (e.g., games, video, images, text) remains viewable. As shown in the embodiment of interface 110 in FIG. 1D, the artifact bucket 140 has digital container 142 that is collapsible (a container that can compactly hide the visual content of artifact objects 136, 138 when artifact bucket 140 is not selected and allow for the visual content of artifact objects 136, 138 to be revealed by clicking a defined portion of the artifact bucket's 140 digital container 142 at location 140a. In some embodiments, the digital container 142 may be presented as any of an accordion window (stacked list that is expandable to reveal artifact objects), a modal window (creates a window having the artifact objects such that user input with the window pauses the mobile application 118 and prevent user interaction with mobile application 118 until the artifact bucket is deselected), and/or a flow window (an animated, two or three dimensional element that allows the user to visually flip or browse through artifact objects).

In order to determine the order or ranking to present the artifact objects within the artifact bucket 140, the injection engine 122 determines a priority value for each artifact object, as previously discussed herein. For example, the header of payload 124 may indicate the priority value corresponding to each artifact object. The header may indicate the value directly (e.g., artifact object 128 priority value=1; artifact object 136 priority value=2). The injection engine 122 may then insert the multiple artifact objects into the artifact bucket 140 based on the priority value determined for each. For example, in an embodiment where visual object 132 is associated with artifact object 136 (having priority value of 2), and visual object 134 is associated with artifact object 128 (having priority value of 1), the injection engine 122 determines that artifact object 128 has a higher priority than artifact object 136 (due to value of 1 being ranked higher than numbers 2 through 10), and in response inserts artifact object 128 and visual object 126 in artifact bucket 140 such that artifact object 128 is presented before, higher, on top of, and/or in another manner that may cause a user to focus on the higher priority artifact object.

In some embodiments, the priority values for artifact objects may be assigned based on one or more of the pixel dimension (where smaller pixel dimensions are given higher priority than larger), file size (smaller memory size gets priority over larger memory size), a subscription status of the target server associated with the artifact object (e.g., the business with a service on target server 164 may pay a higher fee to the operator of network server 166 so that their electronic ad displayed via an artifact object is given a higher priority than other businesses which choose not to subscribe to a higher priority service). An application executing on network server 166 may identify which subscription status target server 164 has paid for and assign the priority value accordingly. In an embodiment, the injection engine 122 may determine that the priority value for multiple artifact objects are the same, and in response, may present the artifact objects within the artifact bucket 140 according to which artifact object will have the least impact on processor efficiency (e.g., via which has less pixel dimensions and/or file size).

In an embodiment, the artifact objects (136, 138) and artifact bucket 140 is presented by the injection engine 122 while the mobile application 118 is executing. In another embodiment, artifact widget 116 may control presentation of artifact bucket 140 and any artifact objects container therein. Having artifact widget 116 control presentation via the artifact bucket 140 may allow for artifact objects (e.g., 136, 138) to be presented even after mobile application 118 stops executing (e.g., if the user closes mobile application 118, navigates to another application, or restarts the UE 102) and/or a visual object (e.g., 132, 134) is removed from memory (e.g., 114). For example, the injection engine 122 may, upon removal of presentation of the visual object 132 in interface 110 (e.g., due to transition from the interface 110 in FIG. 1B to the embodiment of interface 110 in FIG. 1C), inform widget 116 (whether via direct sharing of information using API's or via indirect sharing of a message sent to artifact application 168 executing on a processor of network server 166, which is then relayed back to widget 116 over network 162) that artifact object 136 can be presented within the artifact bucket 140 at a defined anchor location (e.g., location 140a on the interface 110). The artifact widget 116 may overlay the artifact bucket 140 and its digital container 142 on the interface 110 when the visual object 132 is no longer presented by the mobile application 118. In some embodiments, artifact bucket 140 may be hidden from view while mobile application 118 presents electronic content (e.g., 130, 131) on interface 110, and instead present artifact bucket 140 from a home screen presented on UE 102. In some embodiments, artifact widget 116 may execute at startup of the UE 102 and continue execution after injection engine 122 on mobile application 118 ceases executing on processor 104.

Figure 2:
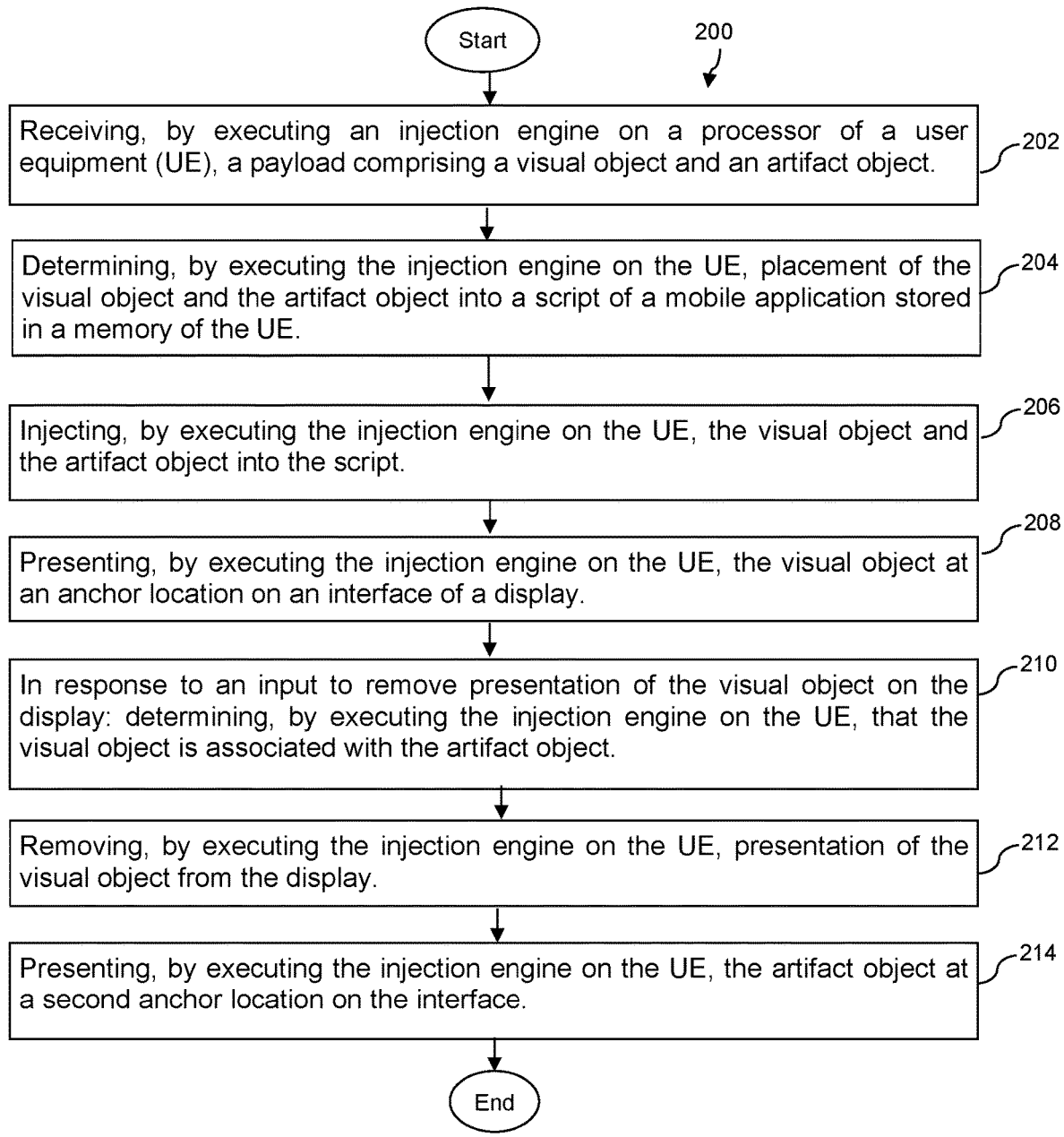
FIG. 2 illustrates an example method according to an embodiment of the disclosure.
Figure 3:
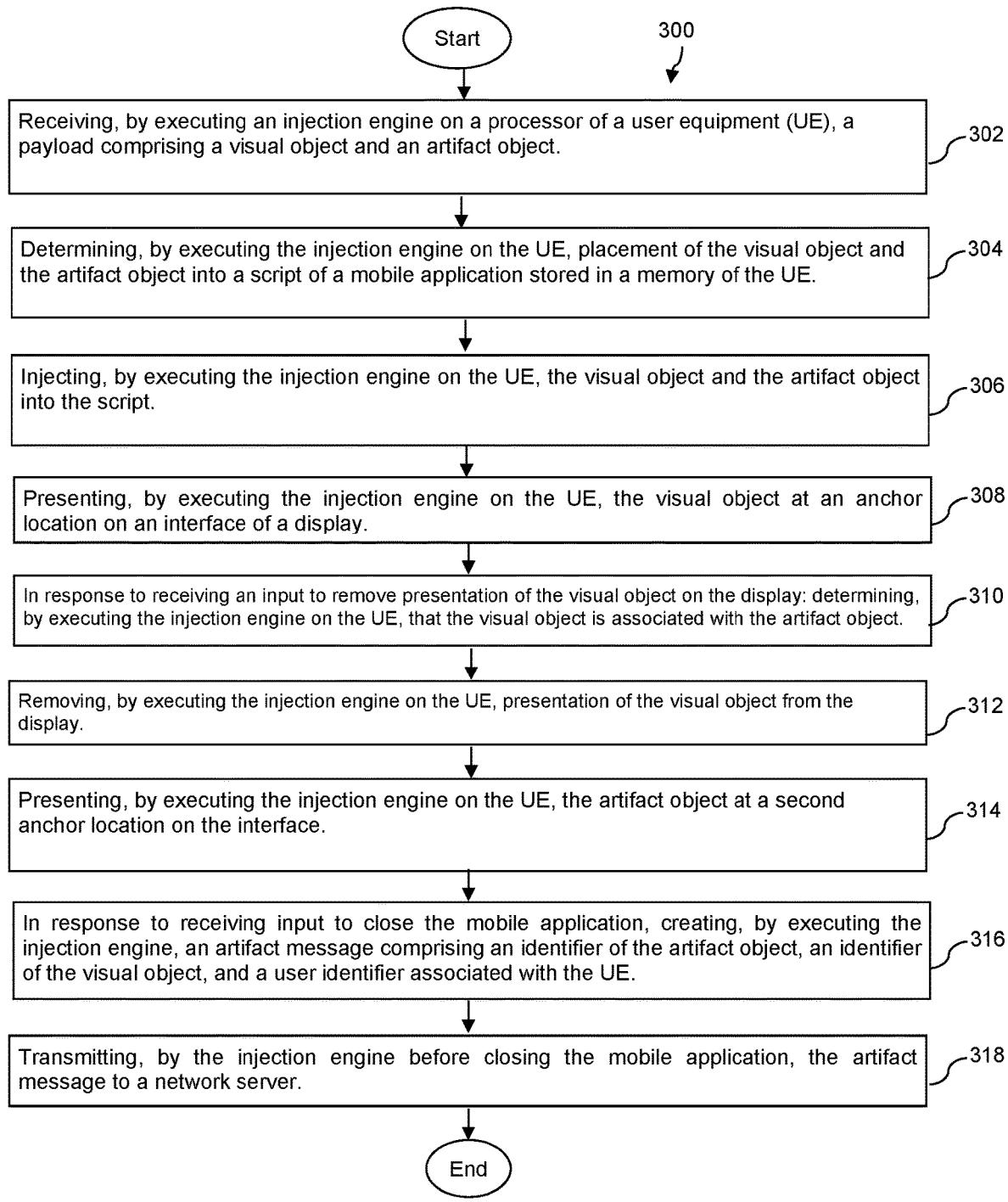
FIG. 3 illustrates an example method according to another embodiment of the disclosure.

FIGS. 2 and 3 are flowcharts of example method 200 and method 300, respectively, for injection and maintenance of artifact objects within user equipment. The methods 200 and 300 may be implemented, in whole or in part, by embodiments disclosed herein, such as system 100 of FIG. 1A, or another suitable non-generic device and/or non-generic system such as discussed with respect to FIGS. 4-7. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Turning now to FIG. 2 with reference to features of an embodiment of FIG. 1A, a method 200 for injection and maintenance of artifacts within user equipment (UE) is disclosed. In general, method 200 may be performed by at least the execution of an injection engine (e.g., 122) on a processor (e.g., processor 104) of a UE (e.g., UE 102).

At step 202, the method 200 comprises receiving, by executing an injection engine on a processor of a user equipment (UE), a payload comprising a visual object and an artifact object. The payload is executable by a processor of the UE and comprises an object source reference (corresponding to the visual object) and an artifact source reference (corresponding to the artifact object). The object source reference and the artifact source reference may each comprise information that identifies the same resource target over the wireless network. For example, each of the object source reference and artifact source reference may have an embedded URI that provides a network address for a target server, such as discussed with respect to system 100 in FIG. 1A.

At step 204, the injection engine executing on a processor of the UE is determining placement of the visual object and the artifact object into a script of a mobile application stored in a memory of the UE. For example, the script 120 may reserve anchor locations on interface 110 for visual objects and artifact objects to be presented. Each visual object and artifact objet may have an anchor location value embedded in the header of payload 124, and the injection engine 122 may use the anchor location values to determine placement at the corresponding anchor locations, which allows the visual objects and artifact objects to be presented at specific locations on the user interface.

At step 206, the injection engine on the UE is injecting the visual object and the artifact object into the script. For example, the injection engine 122 may extract the visual objects and artifact objects from payload 124 and place them in a reserved memory space of memory 114. The script 120 may have pointers corresponding to each memory space, and thus when a visual object and/or artifact object is stored at the memory space, it is injected into the script. This can increase the efficiency of processor executing mobile application 118 due to reducing the length of the script 120, thereby allowing for decreased load time.

At step 208, the injection engine on the UE is presenting the visual object at an anchor location on an interface of a display. For example, the payload 124 may comprise visual object 132 that indicates an anchor location value of "1". The injection engine 122 may map the value of "1" to the first anchor location 132a, and thus present an embedded image provided by the visual object 132 on the interface 110 at anchor location 132a. In some embodiments where a plurality of visual objects are comprised within a payload, the injection engine 122 may present each of the visual objects according to their anchor location value, where the collection of anchor location values provide a defined presentation sequence. For example, visual object 132 may be the first in the presentation sequence due to it being assigned to the first anchor location 132a, and visual object 134 may be second in the sequence due to it having an anchor location value of "2", thus causing it to be mapped to another anchor location 134a.

In some embodiments, the method 200 may include the injection engine 122 detecting an input to remove presentation of a visual object from the graphical user interface (e.g., interface 110). An input to remove presentation of the visual object may include at least one of: input to scroll past the visual object when presented on the interface, input to close the visual object when presented on the interface (e.g., a close or exit button), downsizing the visual object, or any combination thereof.

At step 210, in response to input to remove presentation of the visual object on the display, the injection engine executing on the UE is determining that the visual object is associated with the artifact object. The injection engine 122 may check the artifact source reference associated with the artifact objects on the UE because the artifact source reference may comprise the visual object identifier corresponding to the visual object that is to be removed from presentation (or in some embodiments was removed from presentation). When an artifact source reference has a matching visual object identifier, the injection engine 122 has verified that an association exists between the visual object and an artifact object. In some embodiments, the visual object may be associated with more than one artifact object. In that case, the injection engine may determine a priority value of each associated artifact object and use the highest ranking artifact object first.

At step 212, the injection engine executing on the UE is removing presentation of the visual object from the display. Put simply, the injection engine closes and/or instructs the mobile application to no longer present the visual object in the interface. Removing the visual object from presentation is distinct from removing the visual from the memory on the UE. In some embodiments, the visual object may be retained in memory on the UE for a defined time period after being presented on the interface. In some embodiments, the method may include the injection engine deleting (i.e., removing from memory) the visual object in response to the input that removes presentation of the visual object from the interface on the display. Put simply, when the visual object is no longer presented on the interface, the injection engine may clear the memory sector that retains the visual object and/or overwrite the memory with a new visual object.

At step 214, the injection engine executing on the UE is populating and presenting the artifact object at a second anchor location on the interface. Based on the determined association between the visual object (which is no longer presented) and an artifact object from the payload, the injection engine may identify the second anchor location and populate it with the artifact object, which presents an image and/or video embedded therein. The image and/or video of the artifact object has attributes of the visual object, but has smaller pixel dimensions and/or file size relative to the visual object. The artifact object is configured to receive input and be selected at the second anchor location on the interface. In an embodiment, the method 200 further comprises receiving input that selects the artifact object (which was populated and presented at the second anchor location). In response to the artifact object being selected (i.e., receiving input for its selection), the injection engine may create a message to be sent to a target source, whose address is identified using the artifact source reference of the artifact object. The artifact source reference comprises a URI having a defined address of a server and/or webpage associated with the artifact object.

For example, if a retailer is using an artifact object to present information about an offer code, then the message can reach the target source via the URI. In some embodiments, the message comprises the identifier of the visual object (e.g., the visual object identifier for the visual object that was removed from presentation), the artifact object identifier, a time value corresponding to the amount of time elapsed since the artifact object was initially presented on the interface, or any combination thereof. In some embodiments, when transmitting the message, the injection engine may pause execution of the mobile application and launch another application (e.g., a web browser) that presents a web page having electronic content associated with the artifact object. In an embodiment, the injection engine may create a prompt that requests permission to launch the other application. In response to user input that grants permission, the injection engine allows the other application to launch, and in response to user input that denies permission, the injection engine may continue execution of the mobile application and delay (and/or cancel) the launch request of the other application until permission is granted. In some embodiments, selection of the artifact object may cause transmission of the message without launching the web browser. In embodiments where the UE comprises a widget stored in memory, the injection engine may share (either directly or indirectly via the network server) the message with the widget. The widget executing on the UE may hold the artifact object in memory so that a user may later access one or more artifact objects that they select. This allows the mobile application (having the artifact objects) to continue execution without interruption, thereby providing a smoother user experience and less energy consumption (than if multiple applications were launched).

In an embodiment, the payload may comprise a plurality of visual objects and a plurality of artifact objects. The injection engine may present the visual objects according to the defined presentation sequence. The injection engine may determine that the user provides input to remove presentation of more than one (e.g., a plurality) visual object presented on the interface. Put simply, after a second visual object is no long presented on the interface, the injection engine may determine that an artifact object is associated with the second visual object. Thus, the injection engine is determining that two visual objects correspond with two artifact objects from the payload (one artifact object for each visual object). If the injection engine is already presenting a first artifact object on the interface, and now has determined that a second artifact object could be presented (due to the second visual object being removed from presentation), the injection engine may create an artifact bucket (e.g., artifact bucket 140) at a defined anchor location on the interface. In an embodiment, when the artifact bucket is created, all artifact objects currently presented on the interface are transferred into the artifact bucket. This removes the artifact object from its anchor location on the interface due to being placed within the artifact bucket. In addition to placing the first artifact object (that was being displayed at an anchor location) in the artifact bucket, the injection engine also calls a second artifact object to be placed into the artifact bucket (specifically the one corresponding to the second visual object that was removed).

Continuing with an embodiment of method 200, the injection engine is determining a priority value for each of the two artifact objects. For example, a first artifact object has a priority value (embedded within its artifact source reference) of "1", and a second artifact object has a priority value (embedded within its artifact source reference) of "2". The injection engine 122 may identify that the value of "1" has higher priority than "2", and thus the first artifact object is presented above, on top of, and/or before the second artifact object. With the priority values determined, the injection engine continues with inserting the two artifact objects into the artifact bucket based on the priority values. The artifact bucket may be initially presented on the interface without showing any of the artifact objects contained therein. In response to input that selects the artifact bucket, a selectable menu may be expanded and each of the two (or more) artifact objects are presented according to their respective priority value. The user may scroll, swipe, or otherwise interact with the artifact bucket so as to allow for viewing of the artifact objects contained therein. Each artifact object in the artifact bucket may be selected upon receiving input. The functionality of the artifact object in response to selection may be retained whether inside or outside the artifact bucket, thus selection can still trigger creation and transmission of a message, as previously discussed.

Turning now to FIG. 3, with reference to features of an embodiment of FIG. 1A, a method 300 for injection and maintenance of artifact objects within user equipment (UE) is disclosed. At step 302, the method 300 includes receiving, by executing an injection engine on a processor of a user equipment (UE), a payload comprising a visual object and an artifact object.

At step 304, the injection engine on the UE is determining placement of the visual object and the artifact object into a script of a mobile application stored in a memory of the UE. This allows the injection engine to determine when the visual object should be executed and presented on the interface during execution of the script. For example, if the script of mobile application is for a mobile game, the script may reserve a segment of the script to place the visual object after ten minutes of game play when the user is at a main menu page. Another example would include if the mobile application corresponds with a literary provider (e.g., the news or magazine) and the script allows for a visual object to be injected when the user scrolls or navigates to the defined anchor location after reading certain content (i.e., the electronic content of text is displayed).

At step 306, the injection engine on the UE is injecting the visual object and the artifact object into the script. The injecting may be substantially similar to the feature discussed with respect to system 100 and in method 200. For example, the injection engine may place the visual object(s) and artifact object(s) at a reserved memory location of memory 114. The script may comprise pointers to the respective memory locations such that execution of the script will allow the visual object(s) and/or artifact object(s) to be presented.

At step 308, presenting, by executing the injection engine on the UE, the visual object at an anchor location on an interface of a display. For example, when the script is triggered to execute a string that calls the anchor location (such as due to the user navigating to a specific point in the electronic content), the injection engine may call the visual object from the memory of the UE and present the visual object on the user interface at the anchor location.

At step 310, in response to receiving input to remove presentation of the visual object on the display (e.g., selecting a close button on the visual object, scrolling past the visual object to view electronic content, otherwise navigating away from the interface that presented the visual object, or any combination), the injection engine executing on the UE is determining that the visual object is associated with the artifact object. This may be the result of the injection engine extracting a visual object identifier from the artifact object's artifact source reference and matching it with the identity of the visual object that was removed from presentation (via the visual object identifier embedded in the visual object's object source reference). When the visual identifier embedded in the visual object's object source reference matches the visual identifier embedded within the artifact source reference, then the injection engine has determined that the association exists between the visual object and the artifact object. In some embodiments, the injection engine may determine an association exists before input is received to remove presentation of a visual object.

At step 312, the method 300 continues with the injection engine on the UE removing presentation of the visual object from the display. In some embodiments, the removal of the visual object from the user interface may occur before, after, or concurrent to determination that an association exists and that the corresponding artifact object is queued for presentation. In some embodiments, prior to closing the mobile application, the injection engine may delete (i.e., removing from memory) one or more visual objects from memory of the UE. Although the visual object is deleted, the injection engine may continue to store the artifact object, thus maintaining information about the visual object within a smaller file size. This allows the user the option to later access the visual object's information (e.g., by selecting the artifact object and obtaining the offer code or navigating to the target server associated with the advertised service).

At step 314, the injection engine executing on the UE is populating and presenting the artifact object at a second anchor location on the interface. This may be based on the determination that the association between the artifact object and (no longer presented) visual object. In some embodiments, the injection engine may repeat the process of determining whether another visual object is presented in the interface, whether that visual object has an associated artifact object, and presenting its associated artifact object at a specific anchor location when the visual object is no longer presented. In some embodiments, an artifact bucket may be populated with multiple artifact objects and arranged according to their priority value. In some embodiments, the mobile application may close by pausing and/or ceasing execution on the processor of the UE. This may occur by the user providing input to quit the mobile application executing on the UE, the UE receiving an input to power off the UE, or any combination. The user may alternatively provide input to temporarily navigate to another application on the UE, thus pausing or ceasing executing of the mobile application. In some embodiments, these actions may cause the injection engine to initiate a communication with a network server, such as via an artifact message discussed below.

At step 316, in response to receiving input (e.g., to close the mobile application), the injection engine is creating an artifact message for transmission to the network server. The artifact message comprises an identifier of the artifact object (e.g., an artifact object identifier 178), an identifier of the visual object that is associated with the artifact object (e.g., visual object identifier 176 which corresponds/maps to the artifact object identifier 178), and a user identifier associated with the UE (e.g., user identifier 172).

At step 318, before closing the mobile application, the injection engine initiates and transmits the artifact message to the network server. The network server executes an application on a processor that receives (via the network) artifact messages sent from each injection engines executing on one or more UE's. For example, UE 102 may have five mobile applications that each comprise an instance of injection engine 122. Thus, network server 166 may store a list (e.g., list 174) in memory (e.g., via database 170), where the list comprises artifact messages coming from each injection engine on the UE (i.e., each of the UE's mobile applications that have the injection engine). Thus, even when the operating system on the UE prevents direct sharing of information between mobile applications on the UE, each instance of the injection engine in a mobile application transmits the artifact message to the network server. The injection engines may also reside across multiple devices owned by a user, and thus the list may include artifact messages associated with the user identifier 172, irrespective of whether the artifact messages were sent from one UE or multiple UE's. In some embodiments, the injection engine may later retrieve the list from the network server and populate an artifact bucket within the executing mobile application.

In some embodiments, the UE may comprise an artifact widget, such as artifact widget 116. The artifact widget may communicate with the networks server to obtain and compile information from each instance of an injection engine on the UE via the list of artifact message maintained by the network server. For example, the artifact widget executing on the UE may pull, from the network server, a list of artifact messages from the network server, where the list was populated from at the same UE in which the artifact widget resides. The list may comprise artifact messages associated with the user identifier, irrespective of which UE the artifact message was sent from, and thus the list comprises artifact messages from a plurality of UE's associated with the user identifier. The list of artifact messages may identify artifact objects and visual objects that have been presented on a plurality of mobile applications executing on one or more UE's over a defined time period. For example, the user identifier may be associated with a customer's four UE's, where each UE has one or more mobile applications with injection engines embedded therein. The artifact widget executing on any of the UE's associated with the user identifier may pull the list from the network server and thereby access information about visual objects and/or artifact objects that were previously presented in mobile applications.

In some embodiments, the executing the artifact widget creates a selectable menu comprising artifact objects based on the list of artifact messages that it received from the network server. The artifact widget may then present the selectable menu on a user interface of the UE. In some embodiments, the selectable menu may have substantially the same features as the artifact bucket discussed herein (e.g., the manner in which artifact objects are populated and presented may be substantially the same as that of the artifact bucket). With the list of artifact messages obtained from the network server, the artifact widget can present the selectable menu irrespective of whether an injection engine is concurrently executing on a processor of the UE. This may allow for more efficient processing and battery usage that allows for the user to access and select artifact objects without concurrently executing multiple mobile applications on the UE.

Figure 4:
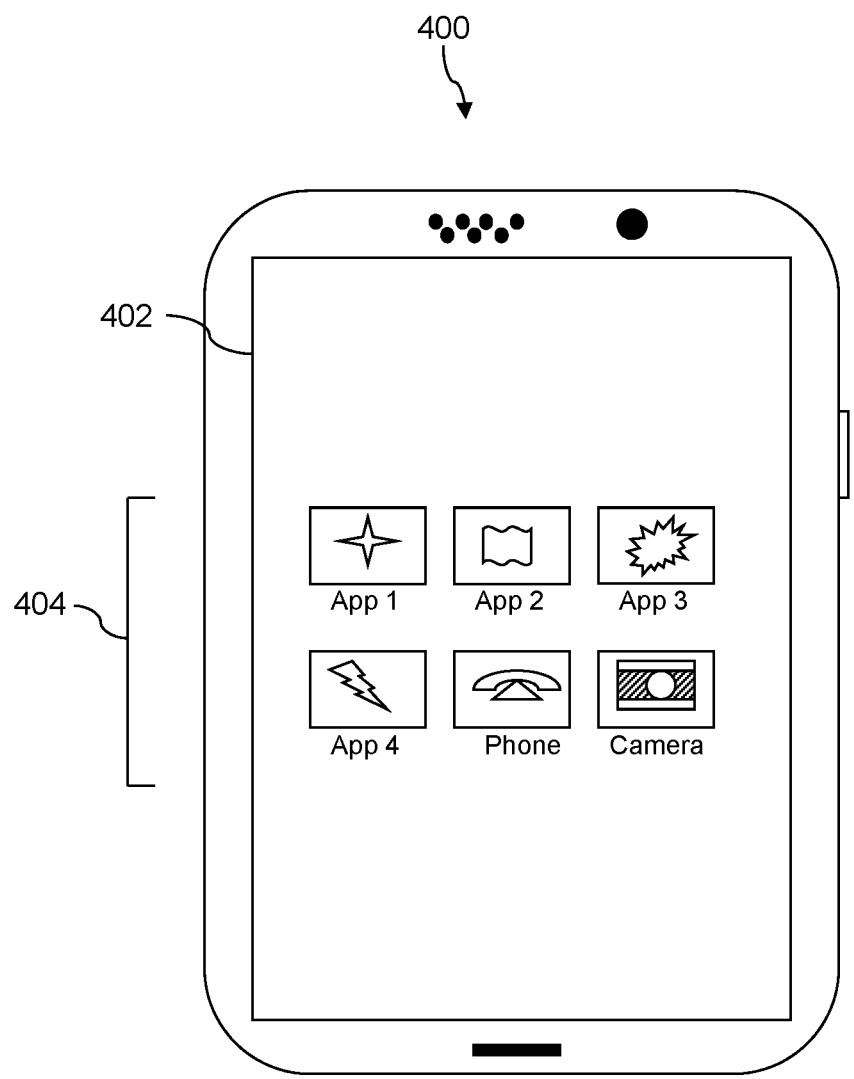
FIG. 4 is an illustration of a user equipment according to an embodiment of the disclosure.

FIG. 4 depicts an embodiment of user equipment (UE) 400, which is operable for implementing aspects of the present disclosure, but the present disclosure should not be limited to these implementations. Though illustrated as a mobile smart phone, the UE 400 may take various forms including a wireless handset, a pager, a personal digital assistant (PDA), a gaming device, or a media player. The UE 400 may be an example of and/or a specific embodiment of the UE 102 discussed above with reference to FIG. 1. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. Some of the application icons 404 may be associated with applications installed in non-transitory memory of the UE and may be configured based on the individual profile, demographics, and/or history of a user associated with the UE 400.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the equipment. The UE 400 may further execute one or more software or firmware applications in response to user commands. These applications may configure the UE 400 to perform various customized functions in response to user interaction.

Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
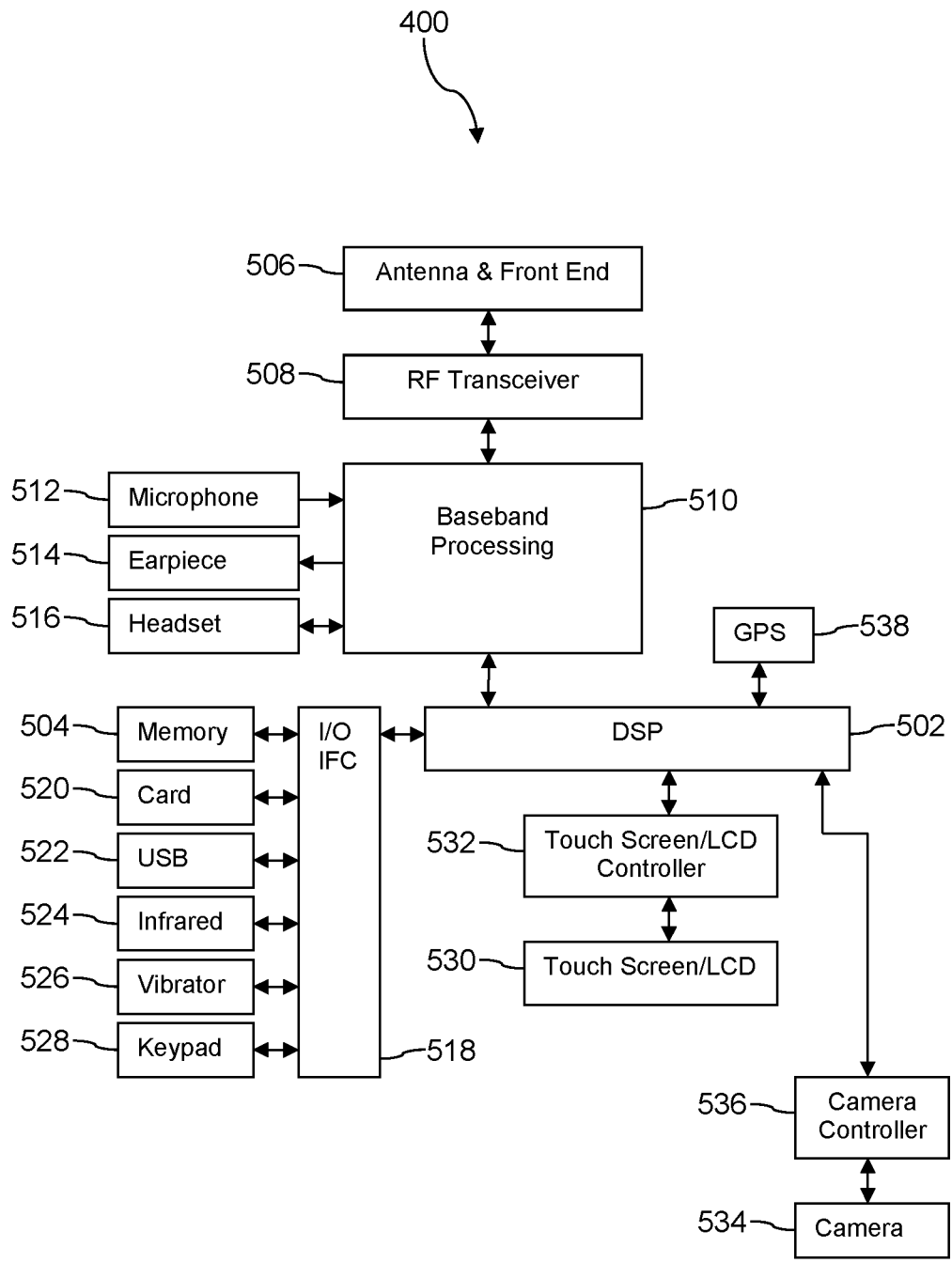
FIG. 5 is a block diagram of a hardware architecture of a user equipment according to an embodiment of the disclosure.

FIG. 5 shows a block diagram of circuitry in an embodiment of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the UE 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the UE 400 to determine its position.

Figure 6A:
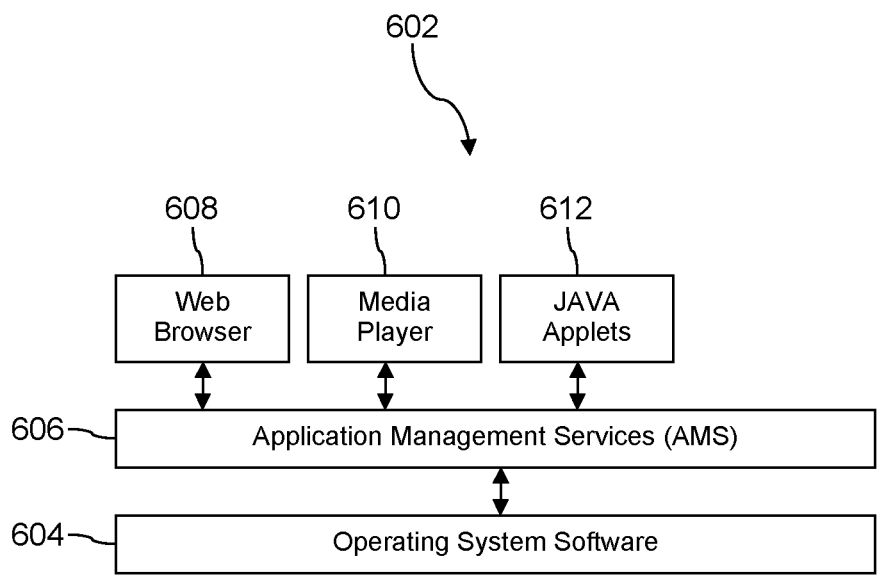
FIG. 6A is a block diagram of a software architecture of a user equipment according to an embodiment of the disclosure.

FIG. 6A illustrates a software environment 602 that may be implemented by the DSP 502, processors of a server, and/or within a cell site. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the mobile device 400 to provide a variety of functionality including games, utilities, and other functionality.

Figure 6B:
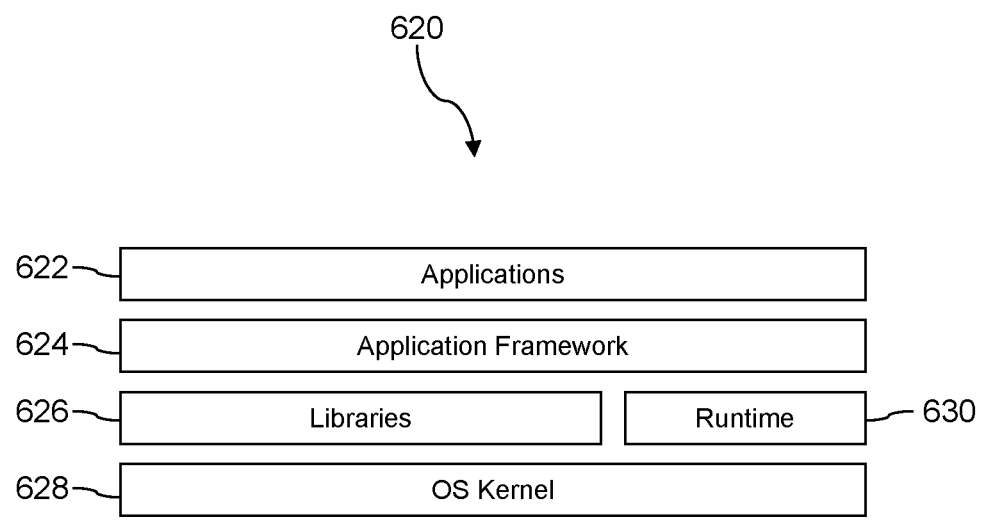
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630, which reside at the system level of the User Equipment and, in some embodiments, their content (e.g., destination addresses) may not be alterable via download and interaction of software from a server over a network. The DSP 502 executes applications 622 that may execute in the execution runtime 630 and may rely upon services provided by the application framework 624. Applications 622 and the application framework 624 may rely upon functionality provided via the libraries 626.

Figure 7:
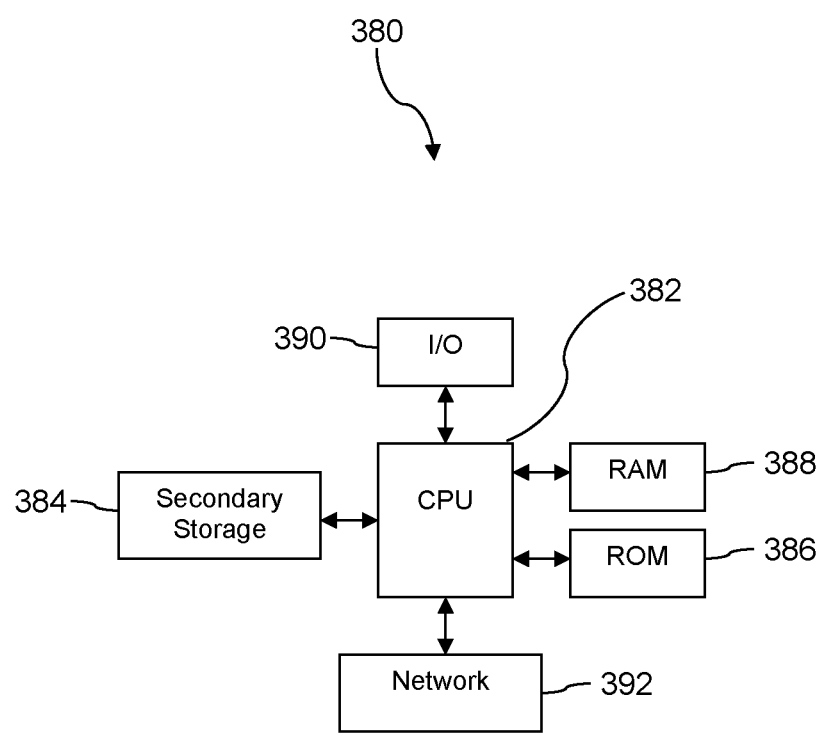
FIG. 7 illustrates an exemplary computer system suitable for implementing the several embodiments of the disclosure.

FIG. 7 illustrates a computer system 380 suitable for implementing one or more embodiments disclosed herein, such as features of system 100 in FIG. 1, including one or more UE 102, network server 166, database 170, target server 164, cell site 160, and operations disclosed in FIGS. 2 and 3. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. It is understood that use of the term "memory" or "storage" in the claims does not include transitory signals. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may be comprised on one or more non-transitory computer readable storage medium having computer executable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. The word "exemplary" is used herein to mean "serving as an example, instance, or illustration." Any implementation described herein as "exemplary" is not necessarily to be construed as preferred or advantageous over other implementations. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for injection and maintenance of artifact objects within user equipment, the system comprising:
    a user equipment (UE) comprising:
        a display that provides an interface;
        a radio transceiver that communicatively couples to a wireless network;
        a processor coupled to the radio transceiver via a communication bus; and
        a memory storing a mobile application comprising a script and an injection engine that, upon being executed, the processor:
            receives a payload comprising a visual object, an object source reference associated with the visual object, an artifact object, and an artifact source reference associated with the artifact object, wherein the object source reference and the artifact source reference identify and provide connection to a same target server, and wherein the artifact object is smaller in at least one of file size or pixel dimension size than the visual object,
            determines placement of the visual object and the artifact object into the script of the mobile application based on a header of the payload,
            injects the visual object and the artifact object into the script,
            presents, via the display, the visual object at an anchor location on the interface,
            in response to at least one of the visual object being removed from presentation on the display or the visual object being deleted from the memory:
                determines that the visual object is associated with the artifact object,
                populates and presents the artifact object at a second anchor location on the interface, and
                in response to receiving an input that selects the artifact object, transmits a message to the target server using the artifact source reference, wherein the artifact source reference enables the target server to ascertain that content being obtained by the UE is due to selection of the artifact object rather than selection of the visual object.

2. The system of claim 1, wherein the visual object is removed from presentation on the display based on scrolling past the visual object when presented on the interface or closing the visual object when presented on the interface.

3. The system of claim 1, wherein the payload comprises a plurality of visual objects and a plurality of artifact objects.

4. The system of claim 3, wherein upon execution of the injection engine, the processor further:
    presents the plurality of visual objects on the interface according to a defined presentation sequence,
    in response to input to remove presentation of the plurality of visual objects presented on the interface, determines that two of the plurality of visual object correspond with two of the artifact objects from the payload,
    creates an artifact bucket at a defined anchor location on the interface,
    determines a priority value for each of the two artifact objects,
    inserts the two artifact objects into the artifact bucket based on the priority value determined for each of the two artifact objects, and
    in response to input that selects the artifact bucket, presents each of the two artifact objects according to their respective priority value.

5. A method for injection and maintenance of artifact objects within user equipment, the method comprising:
    receiving, by executing an injection engine on a processor of a user equipment (UE), a payload comprising a visual object, an object source reference associated with the visual object, an artifact object, and an artifact source reference associated with the artifact object, wherein the object source reference and the artifact source reference identify and provide connection to a same target server, and wherein the artifact object is smaller in at least one of file size or pixel dimension size than the visual object;

determining, by executing the injection engine on the UE, placement of the visual object and the artifact object into a script of a mobile application stored in a memory of the UE;

injecting, by executing the injection engine on the UE, the visual object and the artifact object into the script;

presenting, by executing the injection engine on the UE, the visual object at an anchor location on an interface of a display;

in response to at least one of the visual object being removed from presentation on the display or the visual object being deleted from the memory:

determining, by executing the injection engine on the UE, that the visual object is associated with the artifact object;

presenting, by executing the injection engine on the UE, the artifact object at a second anchor location on the interface; and in response to receiving an input that selects the artifact object, transmitting, by executing the injection engine on the UE, a message to the target server using the artifact source reference, wherein the artifact source reference enables the target server to ascertain that content being obtained by the UE is due to selection of the artifact object rather than selection of the visual object.

6. The method of claim 5, wherein the visual object is removed from presentation on the display based on scrolling past the visual object when presented on the interface or closing the visual object when presented on the interface.

7. The method of claim 5, wherein the payload comprises a plurality of visual objects and a plurality of artifact objects, and wherein the method further comprises:

presenting the plurality of visual objects on the interface according to a defined presentation sequence;

in response to receiving input to remove presentation of the plurality of visual objects presented on the interface, determining that two of the plurality of visual objects correspond with two of the artifact objects from the payload;

creating an artifact bucket at a defined anchor location on the interface;

determining a priority value for each of the two artifact objects;

inserting the two artifact objects into the artifact bucket based on the priority value determined for each of the two artifact objects; and in response to an input that selects the artifact bucket, presenting each of the two artifact objects according to their respective priority value.

8. A method for injection and maintenance of artifact objects within user equipment, the method comprising:

receiving, by executing an injection engine on a processor of a user equipment (UE), a payload comprising a visual object, an object source reference associated with the visual object, an artifact object, and an artifact source reference associated with the artifact object, wherein the object source reference and the artifact source reference identify and provide connection to a same target server, and wherein the artifact object is smaller in at least one of file size or pixel dimension size than the visual object;

determining, by executing the injection engine on the UE, placement of the visual object and the artifact object into a script of a mobile application stored in a memory of the UE;

injecting, by executing the injection engine on the UE, the visual object and the artifact object into the script;

presenting, by executing the injection engine on the UE, the visual object at an anchor location on an interface of a display;

in response to at least one of the visual object being removed from presentation on the display or the visual object being deleted from the memory:

determining, by executing the injection engine on the UE, that the visual object is associated with the artifact object;

presenting, by executing the injection engine on the UE, the artifact object at a second anchor location on the interface;

in response to receiving an input that selects the artifact object, transmitting, by executing the injection engine on the UE, a message to the target server using the artifact source reference, wherein the artifact source reference enables the target server to ascertain that content being obtained by the UE is due to selection of the artifact object rather than selection of the visual object;

in response to receiving an input to close the mobile application, creating, by executing the injection engine, an artifact message comprising an identifier of the artifact object, an identifier of the visual object, and a user identifier associated with the UE; and transmitting, by the injection engine before closing the mobile application, the artifact message to a network server.

9. The method of claim 8, further comprising:

pulling, by an artifact widget executing on the UE from the network server, a list of artifact messages that is populated from a plurality of devices associated with the user identifier;

creating, by executing the artifact widget, a selectable menu comprising artifact objects based on the list of artifact messages; and presenting, by executing the artifact widget, the selectable menu on an interface of the UE.

10. The method of claim 9, wherein the list identifies artifact objects and visual objects that have been presented on a plurality of mobile applications executing on one or more devices over a defined time period.

11. The method of claim 8, wherein the visual object is removed from presentation on the display based on scrolling past the visual object when presented on the interface or closing the visual object when presented on the interface.

12. The method of claim 8, further comprising: prior to closing the mobile application, removing, by executing the injection engine on the UE, at least the visual object from memory of the UE.

\* \* \* \* \*